United States Patent Office 3,413,682
Patented Dec. 3, 1968

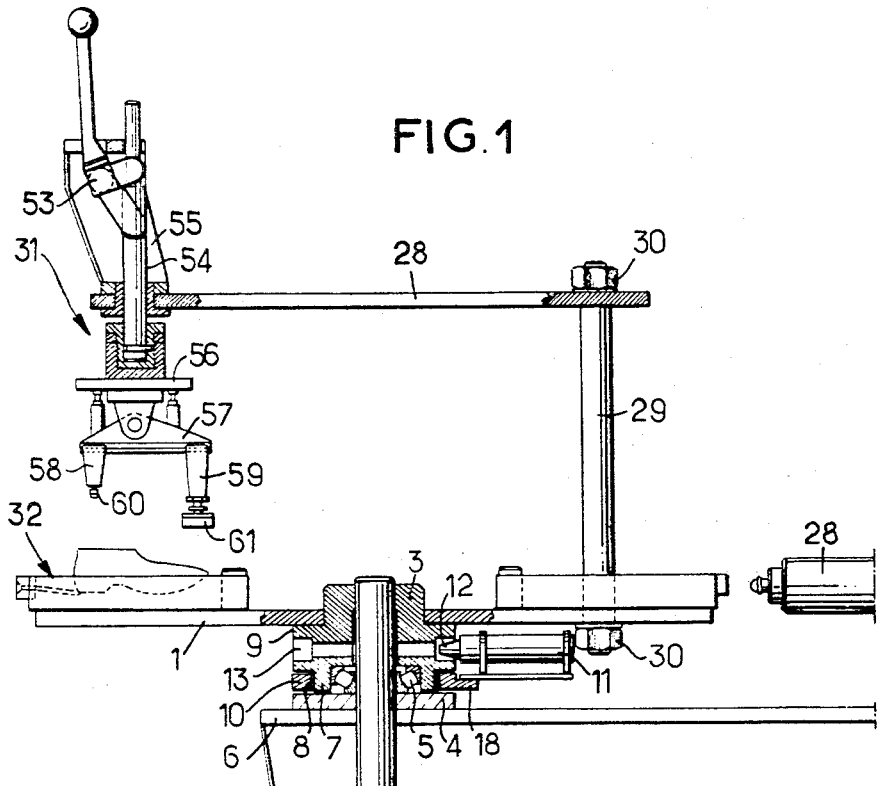

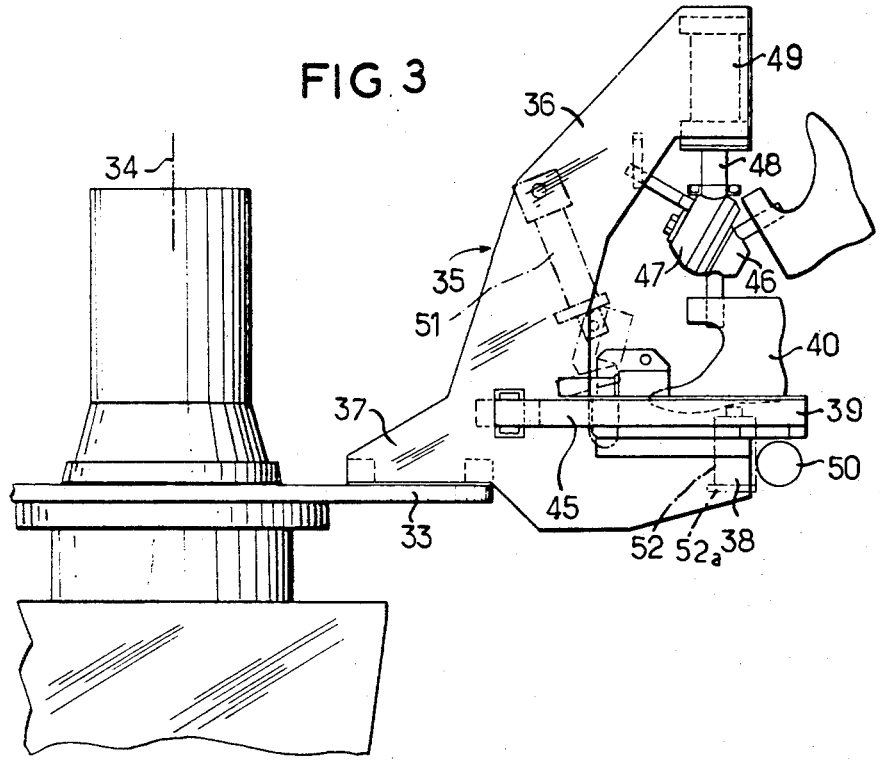
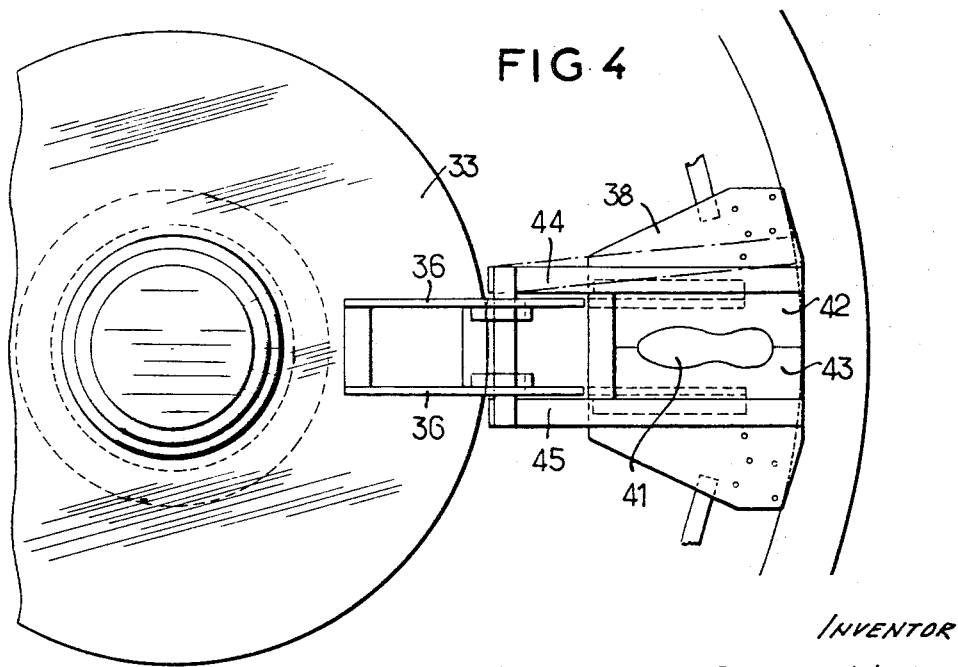

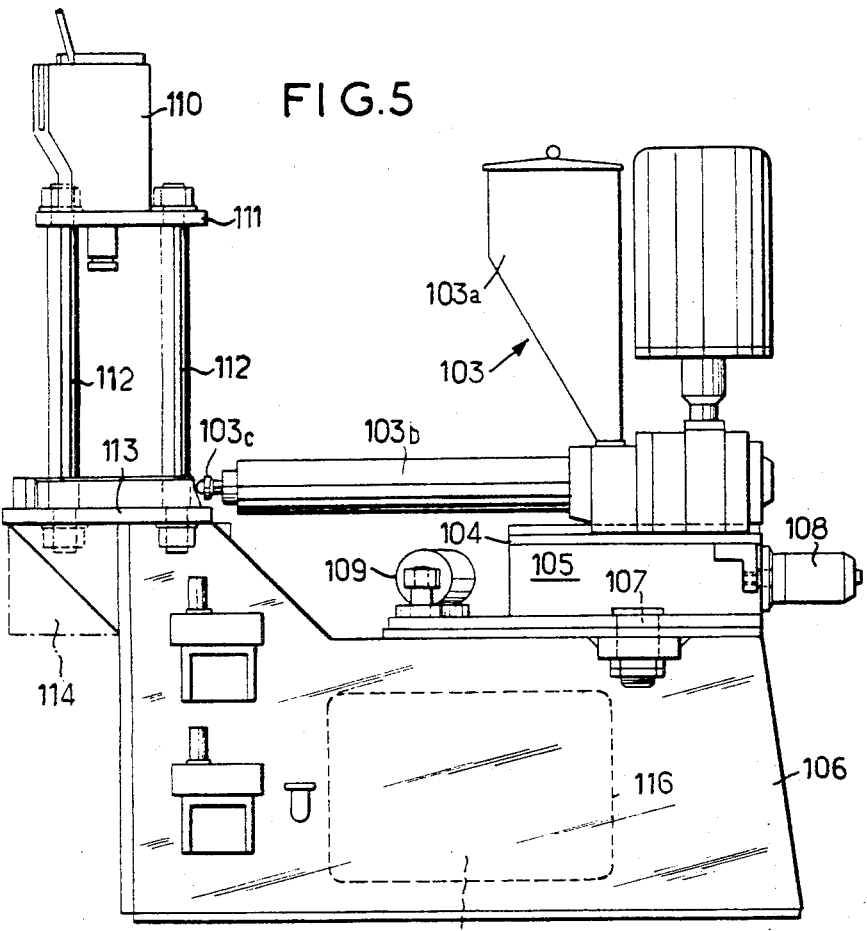
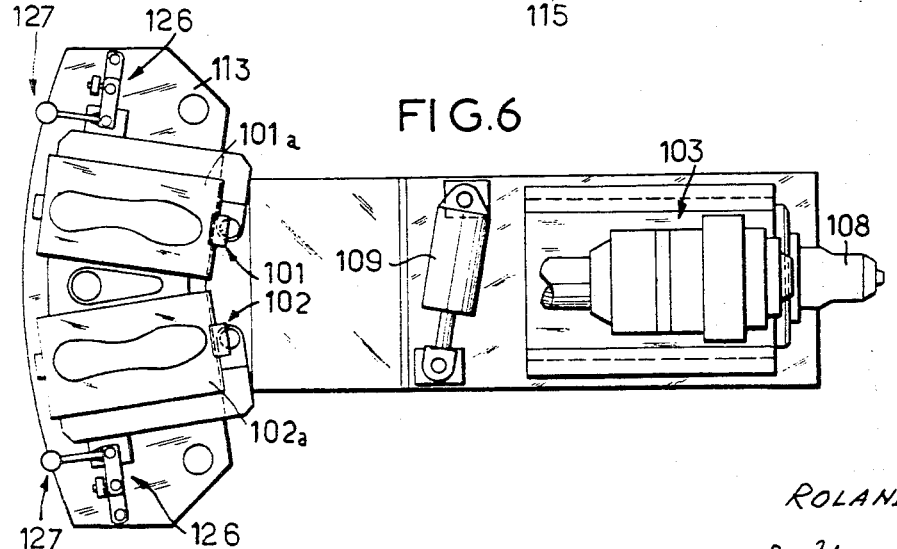

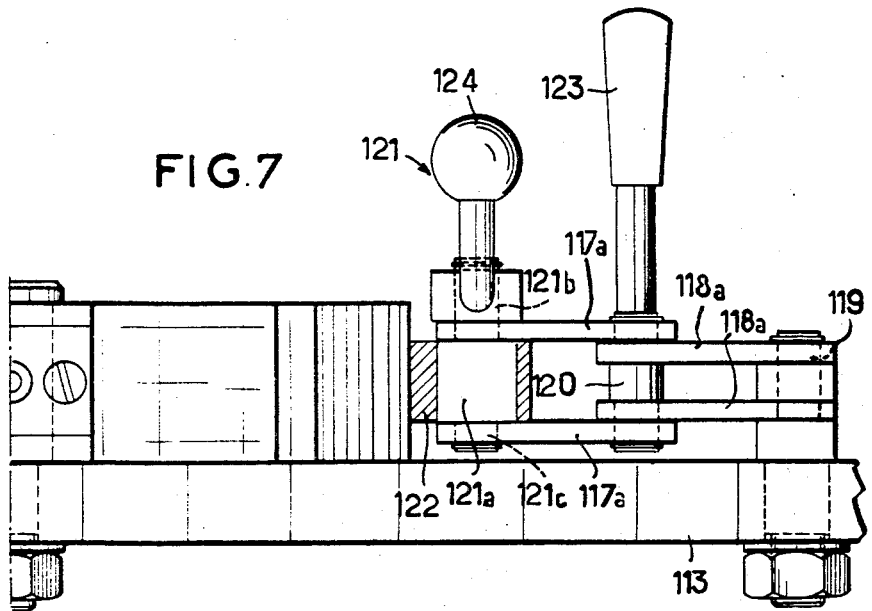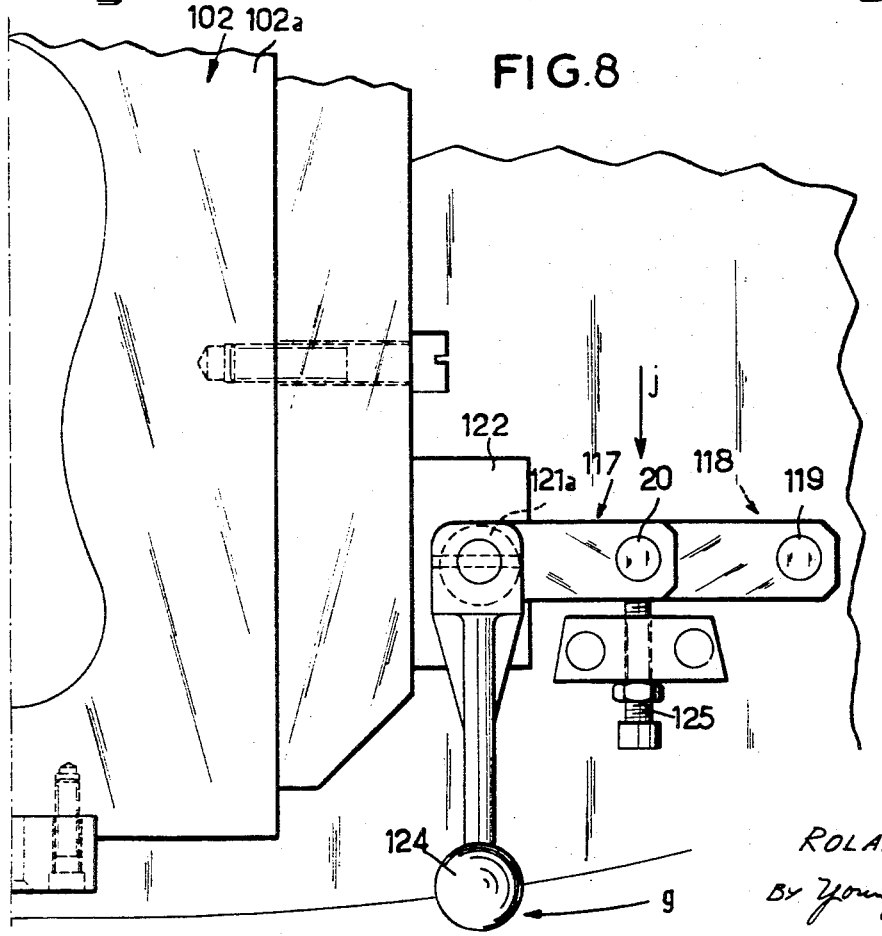

3,413,682
INJECTION MOULDING APPARATUSES WITH ROTATING PLATFORM
Roland Wucher, 24 Rue Jean-Allemane,
Villetaneuse, Seine-St-Denis, France
Filed Aug. 13, 1965, Ser. No. 479,535
Claims priority, application France, Aug. 31, 1964, 986,684; Apr. 20, 1965, 13,821
8 Claims. (Cl. 18—4)

ABSTRACT OF THE DISCLOSURE

In an injection moulding machine having several moulds fixed at the periphery of a rotatable platform, a mechanism for intermittently rotating the platform so that it reaches the end of its movement at approximately zero speed, a means for mounting pushrods for said moulds, by suspending them at the periphery of one plate spaced from the platform, and an arrangement whereby the moulds are fitted within respective open front presses made of cut metal plates.

The present invention relates to moulding apparatus for the production of objects of plastic material or analogous objects.

The invention relates more especially to moulding apparatus comprising several moulds or dies distributed circumferentially on a table and supplied in turn by an injection head.

In known apparatus of this kind, the mould-bearing table performs an intermittent rotary motion, always in the same direction and following each rotation stops in a carefully controlled position in which the injection pipe of a mould is in alignment with the axis of the injection head.

As a rule, the mould-bearing table or platform is of substantial mass and its intermittent displacement tends to cause wear of the material, which wear is intensified if the stopping of the table occurs suddenly.

It is a main object of the present invention to prevent this trouble.

According to the invention moulding apparatus comprises a mould bearing platform, an injection head mounted on a fixed frame, a multiplicity of moulds distributed circumferentially on said platform, and means connected to the platform for bringing the moulds in turn into alignment with said head by a series of rotary angular displacements of the platform with respect to the head each followed by a stopping time, said mould aligning means being arranged so that the rotation of the platform is stopped only when the speed of the platform relative to the frame is zero or substantially so.

In one embodiment of the invention, the head is fixed and the platform which is pivotally mounted on the frame, is displaced by means of an actuation system which allows its speed of rotation to be reduced progressively as it nears its stopping point, this stop occurring at a speed of rotation which is very slow or even zero.

The actuation system referred to above is essentially characterised in that it comprises a toggle mechanism or the like, in which the hinging pins of the two linking bars at their opposite extremities from their common hinge pin are fixed, respectively, to the rotary platform and to the fixed frame of the machine, the toggle linkage straightening progressively to impart the angular displacement required to the platform, and occupying a completely or almost straightened position when the platform is positioned at or close to its stopping point.

The toggle linkage is connected to the platform by means of withdrawable devices, so that the toggle linkage may be reset to the folded position after it has been released from the platform at the end of an angular displacement, and may thereupon be locked to the platform in order to impart to the same another angular displacement, still in the same direction of rotation.

The invention also comprises various other improvements in the mould-bearing platforms, with the purpose of reducing their bulk, facilitating their assembly, increasing their efficiency or of securing other advantages, which will emerge from the following.

According to one of these improvements, the rotary assembly comprises two plates situated one above the other and connected together by means of tie rods or the like, the bottom plate forming the mould-bearing platform as such, and the upper plate carrying vertically aligned push-rods actuated manually or otherwise, adapted to exert a clamping pressure on the moulds by bearing aginst the upper plate.

According to another improvement, the platform carries around its circumference a series of open front presses, each carrying an appropriately cut or recessed supporting plate on which a mould is mounted. The main frame of the press is also made of cut metal plate. The whole may be wholly assembled without welding.

In the production of footwear in which the sole is affixed to the uppers, each of these presses may be operated by four separate rams, that is to say: a lateral clamping ram, to clamp on to the mould base the two elements which with this base form the bottom half of mould; a vertical clamping ram for clamping onto this bottom half of the mould a mould fitted with a footwear upper and forming the top half of the mould; a mould tip support ram for moulding a sole on the upper; a sole compression ram, for exerting a compression of the sole of shoes during moulding, in order to prevent pinholes or cavities and to assure satisfactory adhesion to the uppers.

According to another form of embodiment of the invention, the mould-bearing platform is fixed and the pivotally mounted injection head performs angular displacements in order to be presented in alignment consecutively with each of the moulds mounted on this platform.

In this embodiment, the injection head, as well as the plastifying unit of which it forms part, are arranged in slides on a pivoting mounting, which renders it possible moreover for the assembly as a whole to perform a motion of approach and withdrawal relative to each of the moulds. The motions of approach, of withdrawal and of pivoting may be performed by means of hydraulic or pneumatic rams.

A plant of this kind may comprise an automatic control system of the push-button type, each actuation of the latter causing a complete operating cycle consisting, consecutively, of an approach motion of the injection head, the actual operation of the injection, maintaining the head in the injection position to allow the material injected to begin setting, of a retraction of the head to its idle position, and its rotation in order to be presented to the next moulding point.

The invention moreover relates to an improvement applicable to the toggle clamp or the like with which the opening cheek plates securing the mould are usually equipped. In such clamps, the gripping force reaches its maximum when the common hinging point of the two links of the toggle linkage is situated in alignment with the corresponding pivot centres of these two links at their opposite extremities to the common hinging point. Perfect alignment is impossible to obtain owing to the instability which would be the result, and the stability of the toggle linkage requires moving slightly beyond the line between the centres, under limitation by means of a stop which unavoidably entails slight relaxation of the clamping force of the mould-carrier.

The improvement according to the invention, intended to cancel this relaxation, consists of employing as a linking element, at any one of the hinging points of the toggle mechanism, an eccentric which may be manipulated by a lever and adapted to assure powerful clamping of the mould after the toggle linkage has been set to the clamping position.

In order that the invention may be more clearly understood some embodiments thereof will now be described, by way of example, with reference to the accompanying drawings in which:

FIGURE 1 is a partial vertical section taken along the axis of a mould-bearing platform according to the invention, FIGURE 2 is a plan view corresponding to FIGURE 1, with parts removed, FIGURE 3 is a partial vertical section taken along the axis of another mould-bearing platform according to the invention, FIGURE 4 is a plan view corresponding to FIGURE 3, FIGURE 5 is a schematic elevation of another apparatus according to the invention, FIGURE 6 illustrates a plan view of this plant, and FIGURES 7 and 8 illustrate, respectively, in elevation and in plan view, a detail of a clamping device for a mould-carrier employing an eccentric.

Referring to FIGURES 1 and 2, one sees a mould-bearing platform comprising a horizontal plate 1, mounted pivotally on a vertical shaft 2. The plate 1 is secured to a hub in the form of a case 3 which bears on a support disc 4 through a roller bearing 5, the disc 4 in its turn resting on the frame 6 of the machine.

At its lower part, the case 3 terminates in a skirt 7 whose outer cylindrical face 8 is set back relative to the outer cylindrical face 9 of the main case. The space within the skirt is occupied by the rollers 5, and the space formed outside the skirt by setting back the skirt relative to the main outer face of the case is employed to fit a ring 10. The ring 10 can turn freely relative to the case 3, or else may be clamped to the latter in order to entrain it in a rotary motion.

In the example illustrated, the clamping action is performed by means of a ram 11 mounted permanently on the ring 10, the piston 12 of the ram being adapted to penetrate into one of a series of radial notches 13 formed on the face 9 of the case 3 and spaced apart at regular intervals around its periphery.

The ring 10 is made to rotate by means of a control comprising a ram and a toggle linkage, whose details are shown only in the plan view of FIGURE 2. Two links 14 and 15 of the toggle linkage are hingedly secured to each other by a common hinge pin 16, and are pivotally connected, the one to the ring 10 by means of a hinge pin 17 to a lug 18 integral with the ring 10 at the periphery thereof, and the other to the frame 6 of the machine by means of a hinge pin 19.

The cylinder 21 of the ram 20 assuring the operation of the toggle linkage, has its base hingedly connected to the frame 6 of the machine by means of a hinge pin 22, and its sliding rod 23 terminates in a shackle 24 which is connected to the toggle linkage by the common pin 16 of the two links 14 and 15.

Regarding the operation of the actuating device thus arranged, the condition of FIGURE 2 is that which precedes initiation of the motion of the platform to impart to the platform a displacement corresponding to the angular interval between two consecutive notches 13. In this figure, the ram 20 is in the extended position, the toggle linkage 14, 15 is in the folded position, and the piston 12 of the ram 11 is inserted into a recess 13, which locks the ring 10 to the case 3. The ram 20 is actuated to retract the rod 23 in the direction of the arrow $f$, and the toggle linkage straightens, thereby imparting an angular displacement to the assembly 3 to 10, in the direction of the arrow $g$, this displacement being equal to 60° in the example described herein. This displacement, controlled with all the precision required by means of an adjustable stop 25 secured to the frame of the machine and cooperating with a projection 26 on the ring, assures the positioning of a mould injection nozzle on the axis of a fixed injection head 28.

Once the mould has been filled, the ram 11 is actuated to withdraw the piston 12 from the recess 13, the ram 20 is restored to the extended position, and the ring 10 is freed from the case 3 and turns freely in the direction of the arrow $h$ through an angle of 60°, to present the ram 11 in the axis of the following recess 13 to restart the operating cycle. A second adjustable stop 27 makes it possible to set the angle of return of the ring 10 in the direction of the arrow $h$, the alternating motion of the ram 20 thus causing the ring 10 to oscillate between the stops 25 and 27.

The stop 25, establishing the position of the end of travel of each angular displacement of the plate, is effective only when the toggle linkage 14, 15 is in the straightened position, or almost in this position (the links 14, 15 subtending an angle which is equal or almost equal to 180°), in which position the angular speed of the plate is equal to zero or substantially so. This assures high precision and great smoothness of operation, thereby enhancing the durability of the equipment.

Two variants of the improvements relating to the mould clamping devices will now be described.

The first variant is illustrated in FIGURES 1 and 2, which shows a plate 28 parallel to the plate 3 and rigidly coupled to the same by tie rods 29. The screw-threaded extremities of the tie rods provided with screw-nuts 30 are necked down relative to their shank, so that the tie rods also act as abutments.

A series of pushrods 31, six in the example illustrated, are distributed at regular intervals around a circle and are secured to and depend from the plate 28 and are situated in alignment with a cooperating series of six moulds 32, situated on the lower plate 1. Any action applied by the pushrods 31 on the moulds 32 is accompanied by an equal and opposite reaction of these pushrods on the plate 28. The assembly of the two braced or stayed plates thus operates like a multiple press frame, with an upper cross member 28, a lower cross-member 1, and uprights 29.

This device has the advantage of great flexibility of operation. For example, the distance between the cross members 1 and 28 may be varied easily as a function of the moulds and pushrods. It equally allows the number of moulds and pushrods to be increased or reduced, by appropriate modification of the case 3 and of the stop 27.

The device is equally advantageous in space requirements, given that the element 1 acts simultaneously as a mould-bearing platform and as the bottom cross-member of the press.

The moulds 32 may be of any appropriate type. They do not form part of the invention and will not be described in detail.

The pushrods 31 may also be of any suitable form. The construction illustrated in FIGURE 1 is particularly advantageous. It comprises a toggle mechanism 53 for manual actuation, which allows downward displacement of a rod 54 which is slidingly mounted in the plate 28, bearing on this plate through reinforcements 55.

At its lower end, the rod 54 carries a plate 56 from which is suspended a bearing plate 57, from which depend two legs 58 and 59 terminating in end-pieces 60 and 61 which are arranged to bear on the upper moulding die.

The actuating mechanism of the pushrod is positioned above the plate 28, which makes it easily accessible, whilst reducing the distance between the plates.

In the variant illustrated in FIGURES 3 and 4 a rotary platform 33 has a vertical spindle 34, and carries open front presses 35 set at regular intervals around its circumference. Each press frame is formed mainly of two twin vertical plates 36 cut to C-shape, with an extension 37 allowing them to be fastened to the platform 33.

The bottom limb of the twin C-shaped plates carries a suitably cut metal plate 38, on which is positioned the lower half 39 of a mould for affixing soles on uppers of footwear, the top half of the mould being formed by the upper itself, mounted with an insole on a pattern 40.

The mould portion 39 is formed by a mould base 41 clamped laterally by two plates 42, 43, under the action of the jaws 44, 45, mounted on the sides of the twin frame cheek plates 36. The pattern 40 is mounted on a swivel pin or head 46 having an inclined axis, and turning in a bearing 47 secured to a rod 48 sliding vertically in a ram cylinder 49 mounted on the upper part of the press frame. The swivel head 46 carries two patterns 40 in order to avoid idle periods.

The device may comprise up to four rams, that is to say: a ram 50 assuring the clamping of the jaws 44, 45, the ram 49 referred to above for clamping the pattern 40 on to the mould portion 39, a ram 51 serving to mould a welt or the like at the sole extremity, and a ram 52 arranged to bear on an element 52a solid with the plates 36, and intended to apply a force on the mould base 41 in order to compress the plastic material during moulding to ensure satisfactory adhesion of the sole to the upper and to prevent pinholes or cavities in the case of thick soles.

The aggregate thus arranged has great rigidity. It may be wholly assembled by means of nuts and bolts, without welding, and may be employed for injection mouldings of plastic material or of rubber, as well as for the compression and conversion of rubber. It is extremely compact moreover, since the C-shaped form of the press facilitates the mounting of three rams on one and the same frame, the rams 49 and 52 being mounted at the extremities of the C, and the ram 51 bearing on the strut between these two extremities.

Referring to FIGURE 5 and 6 of the drawings, there is shown a moulding plant comprising two mould carriers 101 and 102 which are fixed, and a plastifying and injection unit marked 103. The unit 103 comprises, in conventional manner, a feed hopper 103a, and a cylinder 103b with a plastifying screw or worm driven by an electric motor through a helical gearing reduction gear. The assembly slides in slides 104 formed in a mounting 105 arranged pivotally on the frame 106, which latter may be made of electrically welded steel plates. The pivot of the mounting 105 is marked 107. The sliding motion of the assembly 103 in the slides 104 is performed by means of a hydraulic or pneumatic ram 108 situated behind this assembly, or at any other point allowing the expected result to be obtained. A second ram 109 assures the rotation of the mounting 105 about the pivot 107.

Each of the mould carriers 101, 102 comprises a mould cover 101a, 102a operated by a toggle mechanism 126 with a locking cam 127 which will be described in detail below.

Two manual presses 110 associated with the corresponding mould carriers 101 and 102 are fastened to a plate 111 supported by three uprights 112, which at the same time perform the function of tie rods between the plate 111 and the mould bearing platform 113. The manual presses, operated by a toggle mechanism, are irreversible in the low position.

On its lower face, the mould bearing platform 113 carries a control panel 114 which in a single apparatus combines an electronic top temperature regulator, and a temperature gauge, as well as push-buttons for automatic and manual operation of the machine.

An electrical box or cabinet 115 situated within the frame and accessible through a lateral door 116, contains the control switches of the motor and of the heating apparatus, the auxiliary relays for operation and verification of the switches, and the electromagnetic valves for the operation of the rams.

The plant also comprises a supply network, not shown, for the actuating rams, with a source of compressed air in the case of pneumatic rams, not illustrated, comprising electrically operated distribution valves, an air lubricator and a piping system.

The different elements of the control panel, of the electric cabinet and of the supply network, may be of any known type and will not be described in detail.

The plant thus arranged operates in the following manner. When the supply of compressed air and of electrical power has been switched on, the worm cylinder 103b is heated to the temperature corresponding to the mixture to be injected. The switch of the panel is set to the automatic cycle position, the plastifying and injection head being situated in the retracted position in alignment with the injection abutment of the mould selected.

Depression of the appropriate push-button of the control panel causes the following operating cycle: approach motion of the injection head in the slides 104 by the action of the ram 108; placing the injection nozzle 103c in contact with the mould, followed by starting the worm motor performing the injection; holding the head in contact with the mould to allow the material injected to begin to set; retraction of the head to its idle position by the reversed action of the ram 108; actuation of the ram 109 with rotation of the head for offering up at the next position.

Another depression of the button causes a repetition of the same operating cycle at this next position. Setting the switch on the control panel to the "manual" position makes it possible to perform the different actions of the operating cycle individually. Stripping from the mould is performed at one position during the injection and setting actions at the adjacent position. The pivotal mounting of the entire plastifying unit, marked 103, makes it possible to balance its mass relative to the pivot centre 107, and to start and stop the whole successively without causing jolts.

FIGURES 7 and 8 show detailed views of the toggle mechanism 109 operating the closure of the mould-carrier 102. This mechanism comprises, in conventional manner, two links 117 and 118, each formed by twin straps 117a and 118a.

The links 117 and 118 are interconnected by a pin 120. The link 118 is hingedly connected to the mould-bearing platform 113 by means of a pin 119; and the link 117 is hingedly connected to a bearing 122 of the opening mould cover 102a by means of a cam 121.

In the form of embodiment described herein, the cam 121 is formed by a shaft stub necked down at both extremities, so that it has a middle portion 121a engaged in the bearing 122, and two terminal pegs 121b, 121c which are coaxial but axially offset relative to the portion 121a, and engaged in the corresponding twin flats 117a. The cam 121 is operated by a lever 124.

To close the mould 102, the lever 123 is displaced in the direction of the arrow j, until the toggle linkage comes into abutment against the adjustable stop 125 in a stable position. The lever 124 is thereupon made to turn in the direction of the arrow g, which assures powerful gripping of the mould by the action of the cam 121, without detracting from the stability of the mechanism.

Adjustment of the stop 125 prior to clamping makes it possible to set the distance by which the pin 120 passes beyond the line between the centres 119, 121b in order to ensure the necessary stability of the toggle linkage.

The arrangements described and illustrated evidently do not establish any limiting scope and may form the object of various variants and modifications without thereby exceeding the scope of the invention.

I claim:
1. Moulding apparatus comprising a mould bearing platform, an injection head mounted on a fixed frame, a multiplicity of moulds distributed circumferentially on said platform, and means connected to the platform for bringing the moulds in turn into alignment with said head by a series of rotary angular displacements of the platform with respect to the head each followed by a stopping time, wherein the mould bearing platform carries on its periphery a series of open front presses, each comprising two suitably cut twin plates extending in two vertical planes, each of the said presses in its lower portion comprising a separate bearing plate of suitably cut metal plate acting as a support for a bottom half-mould for a footwear sole, and in its upper portion a ram mounted between the said twin plates to assure the clamping of an upper half-mould on to the said bottom mould.

2. Apparatus according to claim 1, in which the bottom half-mould is in two halves, and wherein the clamping of the said halves against each other is assured by two jaws correspondingly mounted on the two outer faces of the twin plates and operated by a ram.

3. Apparatus according to claim 1, comprising a ram bearing on the open front press and adapted to exert pressure on the outer face of a footwear upper mounted on a pattern for moulding a welt or the like on said upper.

4. Apparatus according to claim 1, comprising a ram situated below each press and adapted to apply a force on a sliding element of the bottom half-mould to exert a compression force on the material moulded whilst reducing the moulding cavity.

5. A moulding apparatus comprising an injection head mounted on a fixed frame, a mould bearing platform rotatably mounted on said frame and having a plurality of moulds distributed circumferentially thereon, a ring rotatably mounted on said-frame coaxially to said platform, a toggle mechanism having two links assembled by a common hinge pin and pivotally fixed at respective points distant from said hinge pin, one to said frame and the other to said ring at the periphery thereof, reciprocating means acting at said hinge pin on said mechanism for moving it from a folded position to a straightened position and vice-versa, to produce reciprocating angular motions in said ring, and means for selectively engaging said ring to said platform to rotate therewith when said toggle mechanism moves from said folded to said straightened position.

6. A moulding apparatus as recited in claim 5, having a stop on said frame and a cooperating stop on said ring for controlling the end of rotational motion f said platform.

7. A moulding apparatus as recited in claim 5, wherein said platform has a hub with notches spaced evenly around the circumference of the hub, said selectively engaging means comprising a ram secured to the ring and having a sliding rod insertable in any one of said notches.

8. A moulding apparatus as recited in claim 5, wherein the means for moving said toggle mechanism comprises a ram with a cylinder hingedly connected to the frame and a sliding rod connected to the toggle mechanism common hinge pin.

References Cited

UNITED STATES PATENTS

| 3,109,200 | 11/1963 | Ludwig. |
| 3,310,839 | 3/1967 | Son et al. |
| 3,314,112 | 4/1967 | Hardcastle. |

FOREIGN PATENTS

| 1,125,811 | 3/1962 | Germany. |
| 220,020 | 7/1961 | Austria. |
| 243,817 | 3/1963 | Australia. |

WILBUR L. McBAY, *Primary Examiner.*